United States Patent
Yao et al.

(10) Patent No.: US 9,052,432 B2
(45) Date of Patent: Jun. 9, 2015

(54) MULTICORE FIBER

(75) Inventors: Bing Yao, Hitachi (JP); Kazumasa Ohsono, Hitachi (JP); Noribumi Shiina, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 276 days.

(21) Appl. No.: 13/545,270

(22) Filed: Jul. 10, 2012

(65) Prior Publication Data

US 2013/0016949 A1 Jan. 17, 2013

(30) Foreign Application Priority Data

Jul. 11, 2011 (JP) .................................. 2011-152970

(51) Int. Cl.
*G02B 6/02* (2006.01)

(52) U.S. Cl.
CPC ........ *G02B 6/02042* (2013.01); *G02B 6/02357* (2013.01)

(58) Field of Classification Search
None
See application file for complete search history.

(56) References Cited

U.S. PATENT DOCUMENTS

| | | | | |
|---|---|---|---|---|
| 3,844,752 A | * | 10/1974 | Kaiser | 65/393 |
| 6,301,420 B1 | * | 10/2001 | Greenaway et al. | 385/126 |
| 7,080,529 B2 | * | 7/2006 | Dowd et al. | 65/393 |
| 2002/0176677 A1 | * | 11/2002 | Kumar et al. | 385/126 |
| 2004/0151454 A1 | * | 8/2004 | Fajardo et al. | 385/126 |
| 2006/0133753 A1 | * | 6/2006 | Nelson et al. | 385/125 |
| 2009/0067793 A1 | * | 3/2009 | Bennett et al. | 385/125 |
| 2009/0324242 A1 | * | 12/2009 | Imamura | 398/142 |
| 2010/0195965 A1 | | 8/2010 | Sasaoka | |
| 2010/0296784 A1 | * | 11/2010 | Imamura | 385/126 |
| 2011/0052129 A1 | * | 3/2011 | Sasaoka | 385/126 |
| 2011/0222828 A1 | * | 9/2011 | Sasaoka et al. | 385/127 |
| 2012/0087626 A1 | * | 4/2012 | Nagashima et al. | 385/124 |
| 2013/0136404 A1 | * | 5/2013 | Feuer | 385/124 |
| 2013/0294737 A1 | * | 11/2013 | Dianov et al. | 385/127 |
| 2014/0010507 A1 | * | 1/2014 | Sasaki et al. | 385/126 |

FOREIGN PATENT DOCUMENTS

| JP | 2011-018013 A | | 1/2011 |
|---|---|---|---|
| JP | 2012-203035 A | * | 10/2012 |
| JP | 2013-20075 A | * | 1/2013 |

* cited by examiner

*Primary Examiner* — Mike Stahl
(74) *Attorney, Agent, or Firm* — Foley & Lardner LLP

(57) ABSTRACT

A multicore fiber includes cores located at vertexes of a polygonal ring and a cladding including sub medium regions and covering the cores. A refractive index of the cladding is lower than a refractive index of the cores and higher than a refractive index of the sub medium regions. The sub medium regions are arranged at positions to reduce a crosstalk between adjacent cores of the cores.

3 Claims, 8 Drawing Sheets

MULTICORE FIBER

The present application is based on Japanese patent application No. 2011-152970 filed on Jul. 11, 2011, the entire contents of which are incorporated herein by reference.

BACKGROUND OF THE INVENTION

1. Field of the Invention

The present invention relates to a multicore fiber.

2. Description of the Related Art

In recent years, a technique to use a multicore fiber which is an optical fiber having a plurality of cores as a transmission fiber has been suggested. Transmission capacity can be increased by using the multicore fiber compared with the case of using an optical fiber having a single core.

As such a multicore fiber, a fiber having a hole assisted structure in which air holes (sub medium regions) are provided around each core has been known. Japanese Patent Laid-Open No. 2011-18013 (JP-A 2011-18013) shows an example of the hole assisted multicore fibers. According to this multicore fiber, crosstalk between the cores can be reduced by presence of the air holes around each core.

SUMMARY OF THE INVENTION

According to the multicore fiber as disclosed by JP-A 2011-18013, there is however a disadvantage in that the manufacturing thereof is difficult due to the complexity in arrangement of the air holes.

Therefore, an object of the present invention is to provide a multicore fiber in which the arrangement of sub medium regions such as air holes having an effect to reduce the is simplified, thereby which can be manufactured relatively easily.

According to a feature of the invention, a multicore fiber comprises:

cores located at vertexes of a polygonal ring; and a cladding including sub medium regions and covering the cores, a refractive index of the cladding being lower than a refractive index of the cores and higher than a refractive index of the sub medium regions;

in which the sub medium regions are arranged at positions to reduce a crosstalk between adjacent cores of the cores.

In the multicore fiber, the sub medium regions may be arranged within a fan-shaped region in a cross section of the cladding, and the fan-shaped region is a smaller one among two fan-shaped sections defined by two line segments in the cross section of the cladding, and each of the two line segments may link a center of the cladding and a surface of the cladding and pass through a center point of each of the adjacent cores.

In the multicore fiber, a first line segment may link center points of the adjacent cores, the sub medium regions may comprise first sub medium regions arranged along a second line segment crossing the first line segment and the first sub medium regions may be provided in plural for each second line segment, and an intersection of the first line segment and the second line segment may be located between the first sub medium regions provided at both ends of the second line segment.

The second line segment may cross the first line segment at a right angle.

The sub medium regions may further comprise second sub medium regions located along a third line segment which is parallel with the second line segment, in which all straight lines that pass through spaces between the adjacent first sub medium regions and are parallel with the first line segment may cross the second sub medium regions.

In the multicore fiber, no core may be included inside the polygonal ring.

In the multicore fiber, the cores may comprise first cores having a first optical characteristic and second cores having a second optical characteristic which is different from the first optical characteristic, and the first cores and the second cores may be located on the vertexes of the polygonal ring alternately.

In the multicore fiber, the cores may have a same optical characteristic, and an intersection of the first line segment and the second line segment is located at a middle point of the first line segment.

In the multicore fiber, the sub medium regions may comprise a sub medium region arranged around the first sub medium regions located along the second line segment as a marker for positioning.

The number of the second sub medium regions located along one of the third line segments may be different from the number of the second sub medium regions located along other third line segments, and the second sub medium regions located along the one of the third line segments may function as a marker for positioning.

In the multicore fiber, a shape of each of the sub medium regions may be an ellipse which crosses a first line segment linking the adjacent cores, and a longitudinal direction of the ellipse may cross a direction of the first line segment.

The multicore fiber may further comprise a sub medium region located at a center of the cladding.

According to another feature of the invention, a multicore fiber comprises:

cores located at vertexes of a virtual polygonal ring; and a cladding including sub medium regions and covering the cores, a refractive index of the cladding being lower than a refractive index of the cores and higher than a refractive index of the sub medium regions;

in which the sub medium regions are classified into plural groups, and each group is located between adjacent cores to be equidistantly from the adjacent cores.

Each group may be located along a line orthogonal to a line linking the adjacent cores.

The sub medium regions in each group may be located along three lines orthogonal to a line linking between the adjacent cores.

A further core may be located only outside the virtual polygonal ring.

The number of the sub medium regions in one group may be different from the number of the sub medium regions in other groups.

The multicore fiber may further comprise a marker consisting of a sub medium region.

According to the present invention, it is possible to provide a multicore fiber in which the arrangement of sub medium regions such as air holes having an effect to reduce the crosstalk is simplified, thereby which can be manufactured relatively easily.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Embodiments according to the invention will be described in more detail in conjunction with the appended drawings.

A multicore fiber in one embodiment of the present invention is a multicore fiber comprising a plurality of cores positioned at vertexes of a polygonal ring, a cladding including a plurality of sub medium regions and covering the plurality of cores, and a refractive index of the cladding is lower than a refractive index of the plurality of cores and higher than a refractive index of the plurality of sub medium regions, in which the plurality of sub medium regions are arranged at positions to reduce a crosstalk between adjacent cores of the plurality of cores.

Next, examples of this multicore fiber will be explained in more detail.

The First Embodiment

Figure 1A:
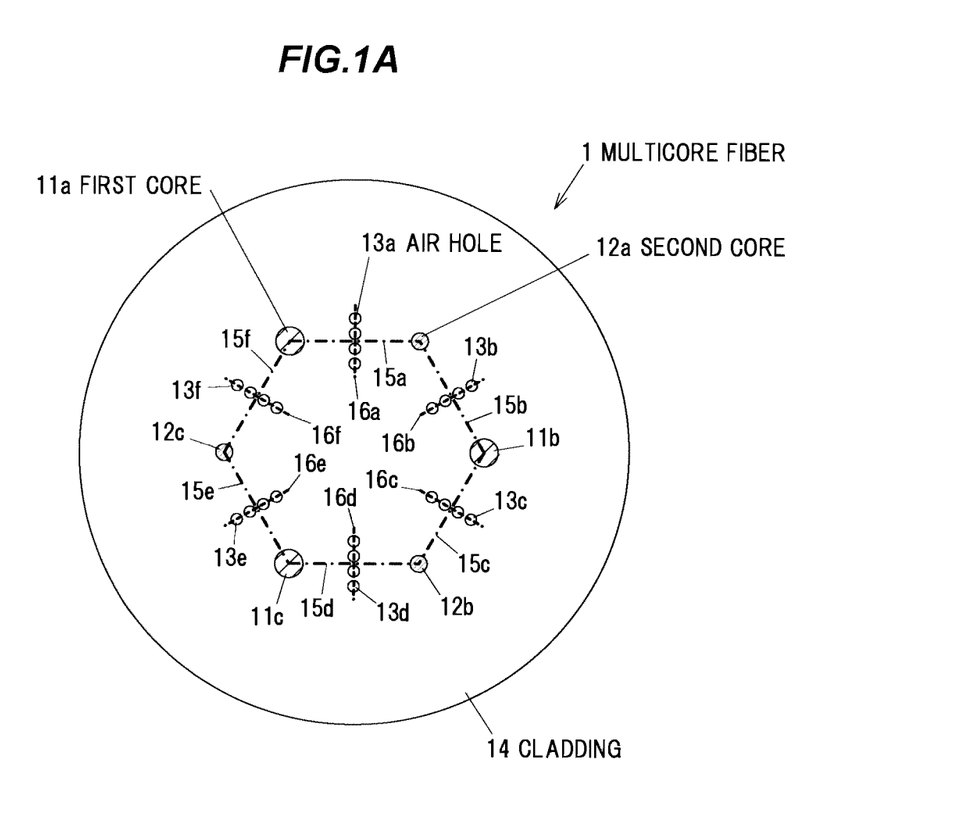
FIG. 1A is a cross sectional view of a multicore fiber in first embodiment according to the present invention.
Figure 1B:
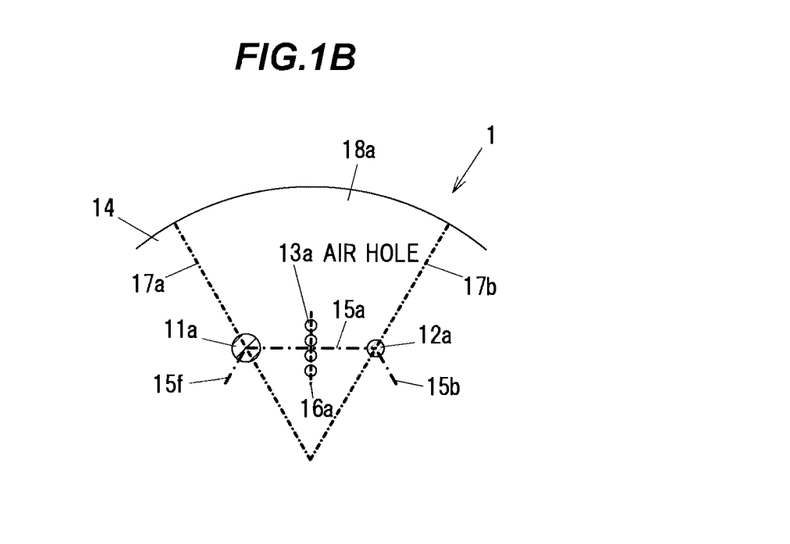
FIG. 1B is a partial enlarged view thereof.

FIG. 1A is a cross sectional view of a multicore fiber 1 in the first embodiment according to the present invention, and FIG. 1B is a partial enlarged view thereof The multicore fiber 1 comprises a plurality of first cores 11 (11a to 11c) having a first optical characteristic, a plurality of second cores 12 (12a to 12c) having a second optical characteristic, a cladding 14 which covers the first cores 11 and the second cores 12, and a plurality of air holes 13 (13a to 13f) that are sub medium regions formed within the cladding 14. In addition, the sub medium regions are not limited to the air holes comprising voids. The sub medium regions may be formed of a material having a refractive index lower than a refractive index of the cladding 14.

The first cores 11 and the second cores 12 are arranged to be located at respective vertexes of a polygonal ring such as hexagonal ring (namely, a virtual polygonal ring is formed by linking respective center points of the first cores 11 and respective center points of the second cores 12). Here, the first cores 11 and the second cores 12 are preferably located alternately at the vertexes of the polygonal ring as shown in FIG. 1A. For this case, the polygonal ring is preferably an n-gonal ring (n is an even number and not less than 4) such as a tetragonal ring, a hexagonal ring. The reason is that the crosstalk between adjacent cores is reduced in the case that the adjacent cores have different optical characteristics from each other compared with the case that the adjacent cores have the same optical characteristic.

A first line segment 15 is a line segment linking a center point of one core of the first cores 11 and a center point of another core of the second cores 12 that is adjacent to the one first core 11, and forming one side of a polygonal ring. In the multicore fiber 1 shown in FIG. 1A, a line segment linking the first core 11a and the second core 12a, a line segment linking the second core 12a and the first core 11b, a line segment linking the first core 11b and the second core 12b, a line segment linking the second core 12b and the first core 11c, a line segment linking the first core 11c and the second core 12c, and a line segment linking the second core 12c and the first core 11a are first line segments 15a, 15b, 15c, 15d, 15e, and 15f, respectively.

In the multicore fiber 1 as shown in FIG. 1A, the first cores 11a to 11c and the second cores 12a to 12c are located on six vertexes of a regular hexagonal ring, and the first line segments 15a to 15f constitute six sides of the regular hexagonal ring. A distance between one of the first cores 11 and one of the second cores 12 that are adjacent to each other in a circumferential direction (a length of each side of the regular hexagonal ring) is e.g. from 20 to 50 μm.

A first optical characteristic of the first core 11 is different from a second optical characteristic of the second core 12. For example, when the first core 11 and the second core 12 have different refractive indices or different effective sectional areas, the first optical characteristic and the second optical characteristic are different from each other.

FIG. 1A shows the first core 11 and the second core 12 having different effective sectional areas. For this case, a diameter of the first core 11 is from 8 to 16 μm and a diameter of the second core 12 is from 4 to 8 μm, respectively. The first core 11 comprises a single mode (SM) core or a large mode area (LMA) core, and the second core 12 comprises a slope-compensating (SC) dispersion compensation core.

A relative refractive index difference of the first core 11 to the cladding 14 is e.g. from 0.25 to 0.4%, and a relative refractive index difference of the second core 12 to the cladding 14 is e.g. from 0.8 to 1.2%.

Each of the first core 11, the second core 12, and the cladding 14 comprises quartz glass and the like. Each of the first core 11 and the second core 12 contains dopant such as Ge, P, for raising the refractive index, and the cladding 14 contains dopant such as B, F, for lowering the refractive index. Also, each of the first core 11 and the second core 12 may contain the dopant for raising the refractive index, and the cladding 14 may contain no dopant. Alternatively, the cladding 14 may contain the dopant for lowering the refractive index, and each of the first core 11 and the second core 12 may contain no dopant. Further, the sub medium region may comprise the air hole (voids). The sub medium region may comprise quartz glass containing dopant such as B, F, for lowering the refractive index.

The air hole (the first air hole) 13 is located along a second line segment 16 crossing (intersecting) the first line segment 15, namely, located at positions where the crosstalk between the adjacent cores of the first cores 11 and the second cores 12 can be reduced. In the multicore fiber 1 as shown in FIG. 1A, the second line segments 16a, 16b, 16c, 16d, 16e, and 16f cross the first line segments 15a, 15b, 15c, 15d, 15e, and 15f, respectively. Further, a plurality of air holes (air holes 13a, 13b, 13c, 13d, 13e, and 13f) are located along the second line segments 16a, 16b, 16c, 16d, 16e, and 16f, respectively.

Each of the air holes 13a to 13f comprises a plurality of air holes. In the multicore fiber 1 as shown in FIG. 1A, each of the air holes 13a to 13f comprises four air holes (in the present specification, these four air holes may be collectively called as "air hole"). For each of the air holes 13a to 13f, the plurality of air holes are arranged such that an intersection of the first line segment 15 and the second line segment 16 is located between the air holes arranged at both ends along the second line segment 16. This arrangement is provided for suppressing the crosstalk between the adjacent cores of the first cores 11 and the second cores 12 effectively. For example, as for the air hole 13a, the air holes constituting the air hole 13a are arranged such that the intersection of the first line segment 15a and the second line segment 16a is located between the air holes at the both ends (namely, a line segment linking respective center points of the air holes constituting the air hole 13a crosses the first line segment 15a).

It is preferable that the intersection of the first line segment 15 and the second line segment 16 is located in the vicinity of the center of the first line segment 15 and that the first line segment 15 crosses the second line segment 16 at a right angle. When the first core 11 or the second core 12 is located to be close to the air hole 13, it is possible that optical characteristics of the first core 11 or the second core 12 may vary, e.g., the dispersion characteristic may be shifted. According to the arrangement of the air hole 13 as described above, it is possible to suppress the crosstalk between the adjacent cores of the first core 11 and the second core 12 effectively.

It is preferable that no core is located inside the polygonal ring (the regular hexagonal ring in FIG. 1A) (e.g. at the center or the cladding 14) surrounded by the first line segments 15a to 15f. In other words, if a further core is provided, the further core should be located only outside the polygonal ring. When the core is located inside the polygonal ring, such a core is close to the first core 11 or the second core 12 (namely, a distance therebetween is reduced). For this case, since the crosstalk tends to increase, it is necessary to arrange the air holes (sub medium region) in all regions therebetween. For this case, the manufacturing of the multicore fiber 1 becomes difficult.

Further, the air hole 13 is located only within a fan-shaped region in a cross section of the cladding 14, or located at a center of the cladding 14 in addition to the air hole 13 located only within this fan-shaped region. Here, the fan-shaped region is a smaller section among two fan-shaped sections defined by two line segments in the cross section of the cladding 14 that pass through the center points of the adjacent cores respectively among the line segments linking the center and the surface of the cladding 14.

For example, as shown in FIG. 1B, the air hole 13a is located only in a fan-shaped region 18a in the cross section of the cladding 14. Here, the fan-shaped region 18a is a smaller one among two fan-shaped sections defined by the line segments 17a, 17b. The line segments 17a, 17b are two line segments passing through the adjacent cores 11a, 12a among the line segments linking the center and the surface of the cladding 14. The air holes 13b to 13f are arranged similarly to the air hole 13a. In the multicore fiber 1 as shown in FIG. 1B, a bisector dividing a central angle (an angle made by the line segments 17a, 17b) of the fan-shaped region 18a in half overlaps the second line segment 16a, and the air hole 13a is located along this bisector.

Further, the air hole 13a and the air hole 13f arranged to sandwich the first core 11a, and located along a radial direction of the cladding 14 respectively. Namely, the air hole 13a and the air hole 13f are arranged to sandwich the first core 11a in the circumferential direction of the cladding 14, but not to sandwich the first core 11a in the radial direction. The air holes constituting the air hole 13a and the air holes constituting the air hole 13f are radially arranged, and the corresponding air holes may be equidistant from the first core 11a.

All the air holes respectively constituting the air hole 13a, 13f (the total number of the air holes is eight in FIG. 1) are not arranged to be located on the same circle having the first core 11a as a center. Namely, the air holes are not arranged to be located on the same circle having a core as a center with equiangular intervals like the holey fiber. The arrangement of the other air holes 13 and the first cores 11 or the second cores 22 is similar to the above configuration.

In other words, the sub medium regions are classified into plural groups, and each group is located between adjacent cores to be equidistantly from the adjacent cores. Each group of the sub medium regions may be located along a line orthogonal to a line liking the adjacent cores. More specifically, each group of the sum medium regions are spaced from the adjacent cores and concentrated to the line orthogonal to the line linking the adjacent cores.

The Second Embodiment

The second embodiment is different from the first embodiment in that the first core and the second core have the same optical characteristic. As to the elements similar to the first embodiment, the description thereof is omitted or simplified.

Figure 2:
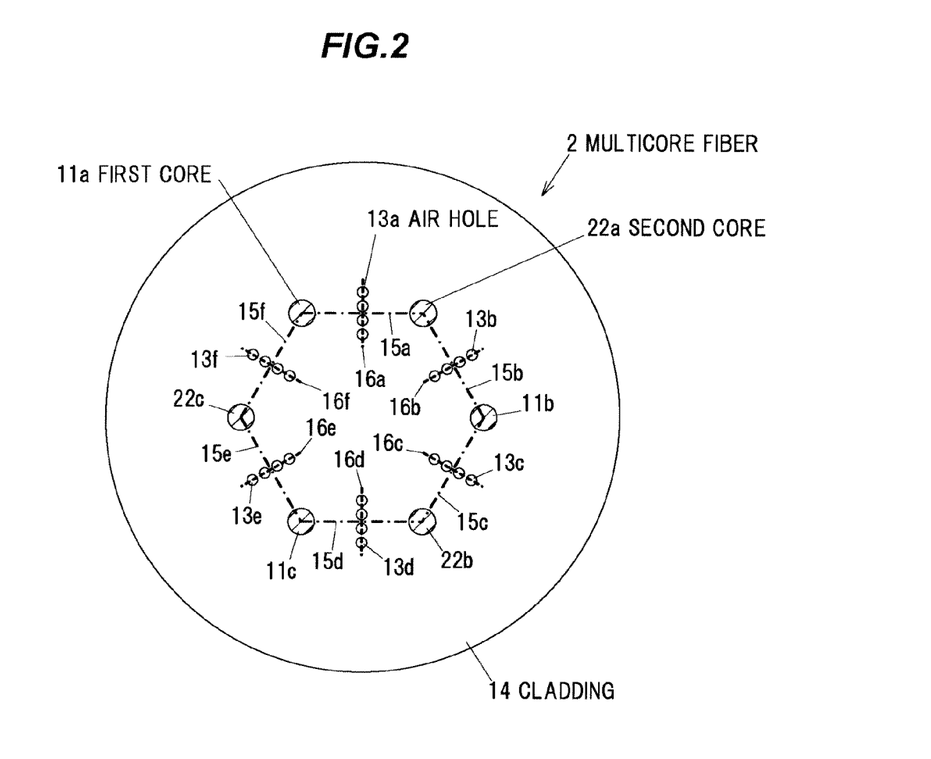
FIG. 2 is a cross sectional view of a multicore fiber in second embodiment according to the present invention.

FIG. 2 is a cross sectional view of a multicore fiber 2 in the second embodiment according to the present invention. The multicore fiber 2 comprises a plurality of first cores 11 (11a to 11c), a plurality of second cores 22 (22a to 22c), a cladding 14 which covers the first cores 11 and the second cores 22, and a plurality of air holes 13 (13a to 13f) that are sub medium regions formed within the cladding 14. In addition, the sub medium region may be formed of a material having a lower refractive index than a refractive index of the cladding The first core 11 and the second core 22 have the refractive indices and the effective sectional areas that are equal to each other and the same optical characteristic. For example, a diameter of the first core 11 is from 8 to 16 μm and a diameter of the second core 22 is from 8 to 16 μm, respectively. Each of the first core 11 and the second core 22 comprises a single mode (SM) core or a large mode area (LMA) core.

A relative refractive index difference of the first core 11 and the second core 22 to the cladding 14 is e.g. from 0.25 to 0.4%.

Each of the first core 11 and the second core 22 contains dopant such as Ge, P, for raising the refractive index, and the cladding 14 contains dopant such as B, F, for lowering the refractive index. Also, each of the first core 11 and the second core 22 may contain the dopant for raising the refractive index, and the cladding 14 may contain no dopant. Alternatively, the cladding 14 may contain the dopant for lowering the refractive index, and each of the first core 11 and the second core 22 may contain no dopant. Further, the sub medium region may comprise the air hole (voids). Alternatively, the sub medium region may comprise quartz glass containing dopant such as B, F, for lowering the refractive index.

It is preferable that the intersection of the first line segment 15 and the second line segment 16 is located at the center of the first line segment 15 and that the first line segment 15 crosses the second line segment 16 at a right angle. According to this arrangement, it is possible to suppress the shift in optical characteristics between the adjacent cores of the first core 11 and the second core 12 due to the presence of the air holes 13 effectively.

The Third Embodiment

The third embodiment is different from the first embodiment in the number of air holes. As to the elements similar to the first embodiment, the description thereof is omitted or simplified.

Figure 3A:
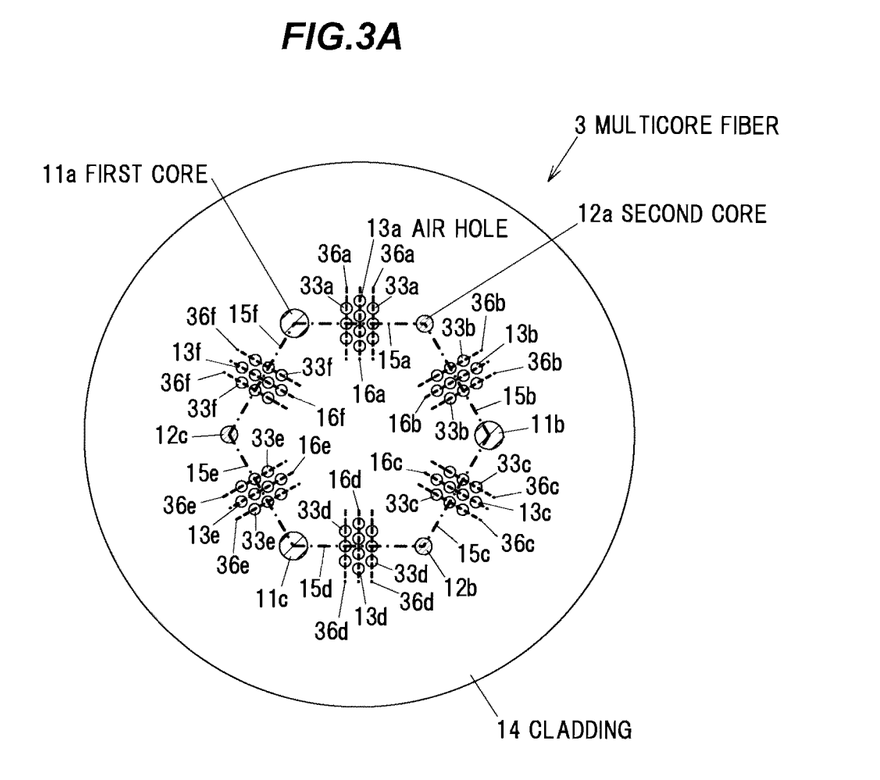
FIG. 3A is a cross sectional view of a multicore fiber in third embodiment according to the present invention.

FIG. 3A is a cross sectional view of a multicore fiber 3 in the third embodiment according to the present invention. The multicore fiber 3 comprises a plurality of first cores 11 (11a to 11c), a plurality of second cores 12 (12a to 12c), a cladding 14 which covers the first cores 11 and the second cores 12, and a plurality of air holes 13 (13a to 13f) and a plurality of air holes 33 (33a to 33o) that are both formed within the cladding 14.

The air hole 13 is arranged along the second line segment 16 (16a to 16f). The air holes 33 (33a to 33f) are arranged along third line segments 36 (36a to 36o) provided on both sides of the second line segment 16 (16a to 16f), The third line segments 36 cross the first line segment 15 and are parallel to the second line segment 16. In addition, the third line segment 36 may be located only on one side of the second line segment 16 and the number of the third line segments 36 may be three or more.

Figure 3B:
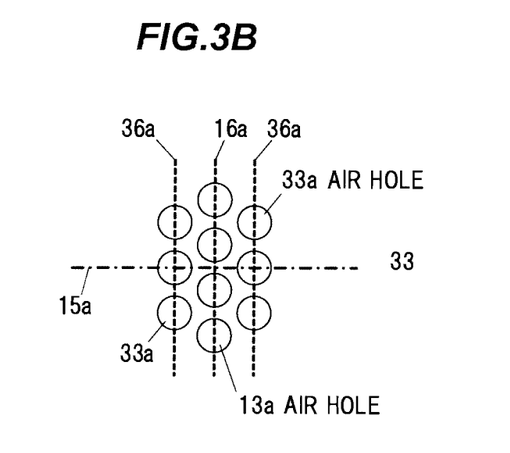
FIG. 3B is an enlarged view of a peripheral region of some air holes.

FIG. 3B is an enlarged view of a region around the air holes 13a, 33a The air hole 13a is located along the second line segment 16a, and the air holes 33a are located along the third line segments 36a. All the straight lines that passes through spaces between the adjacent air holes of the air hole 13a and are parallel with the first line segment 15a cross the air holes 33a. In addition, all the straight lines that passes through spaces between the adjacent air holes of the air holes 33a and are parallel with the first line segment 15a cross the air hole 13a. The air holes 33b to 33f are arranged similarly to the arrangement of the air holes 33a. In other words, all the line segments that are parallel with the first line segment 15 made by linking the first core 11a and the second core 12a cross at least one of the air holes 13a, 33a.

In other words, the sub medium regions in each group may be located along three lines orthogonal to a line linking between the adjacent cores.

According to this arrangement, it is possible to suppress the crosstalk between the adjacent cores of the first core 11 and the second core 12 more effectively.

The Fourth Embodiment

The fourth embodiment is different from the first embodiment in the number and the shape of the sub medium region (air holes). As to the elements similar to the first embodiment, the description thereof is omitted or simplified.

Figure 4:
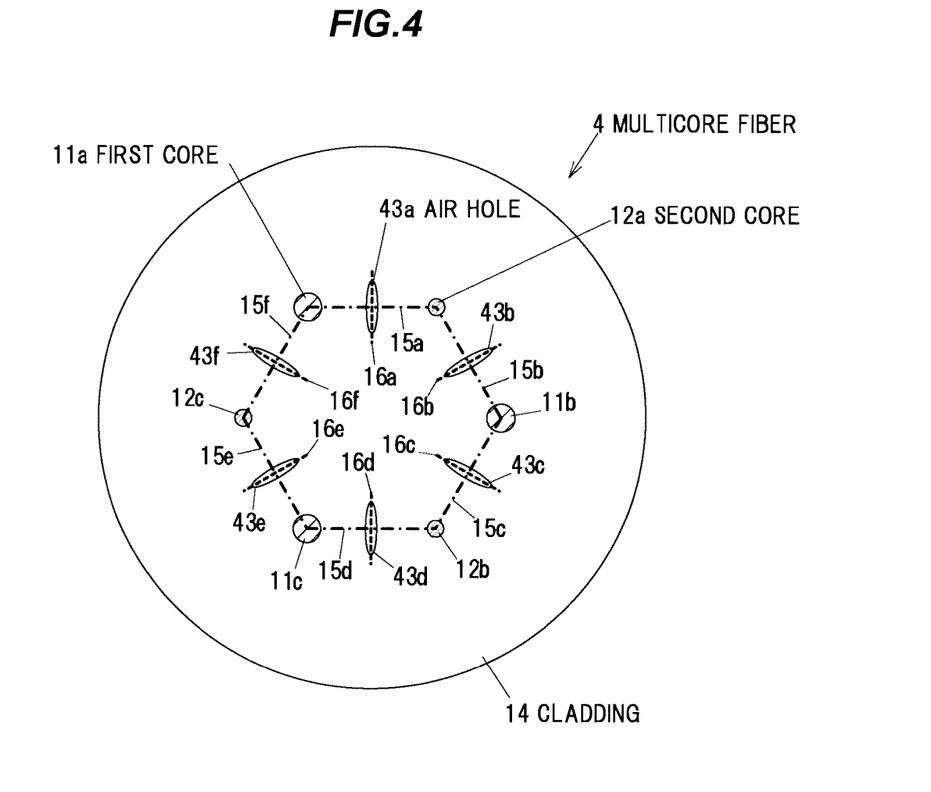
FIG. 4 is a cross sectional view of a multicore fiber in fourth embodiment according to the present invention.

FIG. 4 is a cross sectional view of a multicore fiber 4 in the fourth embodiment according to the present invention. The multicore fiber 4 comprises a plurality of first cores 11 (11a to 11c), a plurality of second cores 12 (12a to 12c), a cladding 14 which covers the first cores 11 and the second cores 22, and a plurality of air holes 43 (43a to 43f) that are sub medium regions formed within the cladding 14.

The air hole 43 is located along the second line segment 16 crossing the first line segment 15, namely, located at a position where the crosstalk between the adjacent cores of the first cores 11 and the second cores 12 can be reduced. In the multicore fiber 4 as shown in FIG. 4, a plurality of air holes (air holes 43a, 43b, 43c, 43d, 43e, and 43f) are located along the second line segment 16a, 16b, 16c, 16d, 16e, and 16f, respectively.

Each of the air holes 43a to 43f comprises a single air hole having an elliptic cross section. It is preferable that a length in a longitudinal direction (i.e. length of a major axis of the ellipse) of each of the air holes 43a to 43f is determined such that each of the air holes 43a to 43f necessary crosses all the line segments linking between the adjacent cores. The air holes 43a to 43f cross the first line segments 15a to 15f respectively, and the longitudinal direction (the major axis) of the elliptic cross section of each of the air holes 43a to 43f crosses each of the corresponding first line segments 15a to 15f, i.e., the short direction (the minor axis) of the ellipse of each of the air holes 43a to 43f is same as the circumferential direction of the cladding 14. Particularly, it is preferable that the longitudinal direction of the ellipse of each of the air holes 43a to 43f is orthogonal to each of the corresponding first line segments 15a to 15f, and they cross each other at a middle point of each of the first line segments 15a to 15f. According to this arrangement, it is possible to suppress the crosstalk between the adjacent cores of the first core 11 and the second core 12 effectively.

The Fifth Embodiment

The fifth embodiment is different from the first embodiment in that an air hole to be used as a marker for specifying a position is formed. As to the elements similar to the first embodiment, the description thereof is omitted or simplified.

Figure 5:
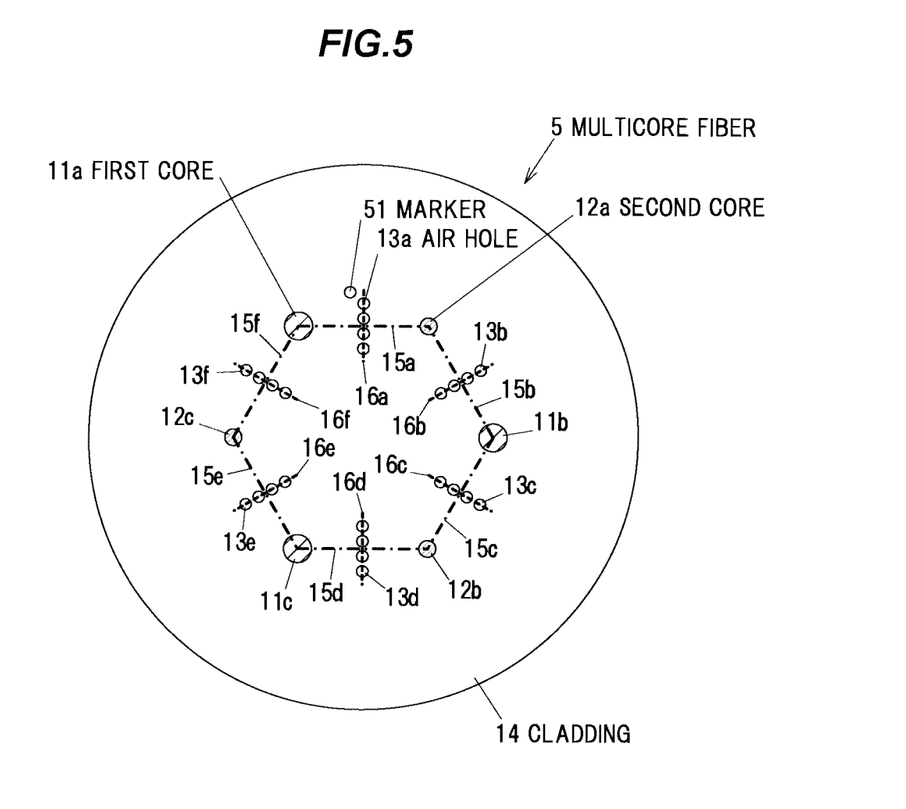
FIG. 5 is a cross sectional view of a multicore fiber in fifth embodiment according to the present invention.

FIG. 5 is a cross sectional view of a multicore fiber 5 in the fifth embodiment according to the present invention. The multicore fiber 5 comprises a plurality of first cores 11 (11a to 11c), a plurality of second cores 12 (12a to 12c), a cladding 14 which covers the first cores 11 and the second cores 12, and a marker 51 for positioning which comprises a sub medium region such as an air hole having a refractive index lower than a refractive index of the cladding 14.

The marker 51 is composed of an air hole provided around or in vicinity of the air hole 13a for specifying the position by visual observation. The marker 51 is formed only around or in vicinity of the air hole 13a and not formed around or in vicinity of the air holes 13b to 13f, so that the position of the air hole 13b can be specified easily, thereby a rotation angle and the like of the multicore fiber 5 can be specified.

Here, the arrangement of marker 51 is not limited to the arrangement shown in FIGS. In addition, the marker 51 may comprise a plurality of air holes.

The Sixth Embodiment

The sixth embodiment is different from the third embodiment in that the number of air holes in a region is reduced and such a region is used as a marker for specifying the position. As to the elements similar to the first embodiment, the description thereof is omitted or simplified.

Figure 6A:
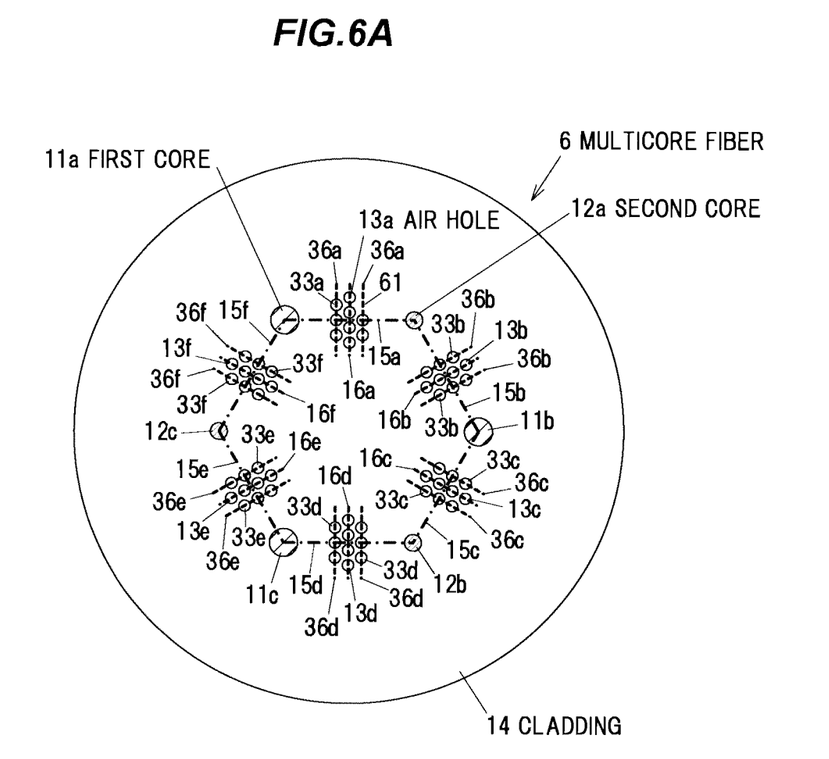
FIG. 6A is a cross sectional view of a multicore fiber in sixth embodiment according to the present invention.

FIG. 6A is a cross sectional view of a multicore fiber 6 in the sixth embodiment according to the present invention. The multicore fiber 6 comprises a plurality of first cores 11 (11a to 11c), a plurality of second cores 12 (12a to 12c), a cladding 14 which covers the first cores 11 and the second cores 12, and a plurality of air holes 13 (13a to 13f) and a plurality of air holes 33 (33a to 33f) that are formed within the cladding 14.

Figure 6B:
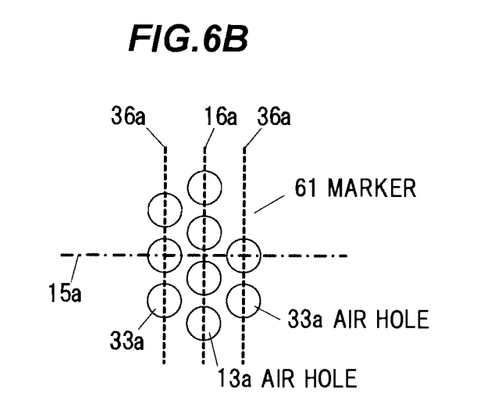
FIG. 6B is an enlarged view of a peripheral region of some air holes.

FIG. 6B is an enlarged view of a region around the air holes 13a, 33a. The air hole 13a is located along the second line segment 16a, and the air holes 33a are located on the third line segments 36a. The number of air holes which constitute the air hole 33a is less than the number of air holes which constitute each of the air holes 33b to 33f The air hole 33a includes no air hole in a predetermined region while the same region in each of the air holes 33b to 33f includes the air hole, and the predetermined region with no air hole in the air hole 33a functions as marker for specifying the position of the air hole 33a. This predetermined region is shown as a marker 61 in FIGS. 6A and 6B. In other words, the number of the sub medium regions in one group is different from the number of the sub medium regions in other groups.

The position of the marker 61, i.e. the position of the predetermined region with no air hole in the air hole 33a is not limited to the location as shown in FIGS. 6A and 6B. In addition, the marker 61 may comprises a plurality of predetermined regions with no air hole.

Effects of the Embodiments

According to the embodiments of the present invention, it is possible to provide a multicore fiber including the air holes by which the crosstalk can be reduced and variation in optical characteristics of the core due to the air holes can be suppressed. In addition, since the crosstalk is reduced effectively and the variation in optical characteristics of the core can be suppressed effectively, it is possible to arrange the cores of the multicore fiber with high density.

In the conventional multicore fiber with the hole assisted structure has a configuration that the air holes are arranged uniformly around each core, the total configuration thereof is complicated and it is difficult to arrange the air holes at predetermined positions, so that the manufacturing of the conventional multicore fiber has been difficult. On the contrary, the multicore fiber in the embodiments of the present invention has a configuration that the air holes (sub medium regions) are arranged between the adjacent cores, and that the air holes are not dispersed within the cladding but collected to some extent, so that the total configuration thereof is simplified and the manufacturing of the multicore fiber in the present embodiments is relatively easy.

Herein, the present invention is not limited to the aforementioned embodiments, and various modifications and variations may be enforced without going beyond the scope of the invention. For example, a sub medium region may be provided at the center of the cladding to reduce the crosstalk between the cores facing to each other. In addition, essential elements of the embodiments may be combined arbitrarily without going beyond the scope of the invention.

EXAMPLES

Figure 7A:
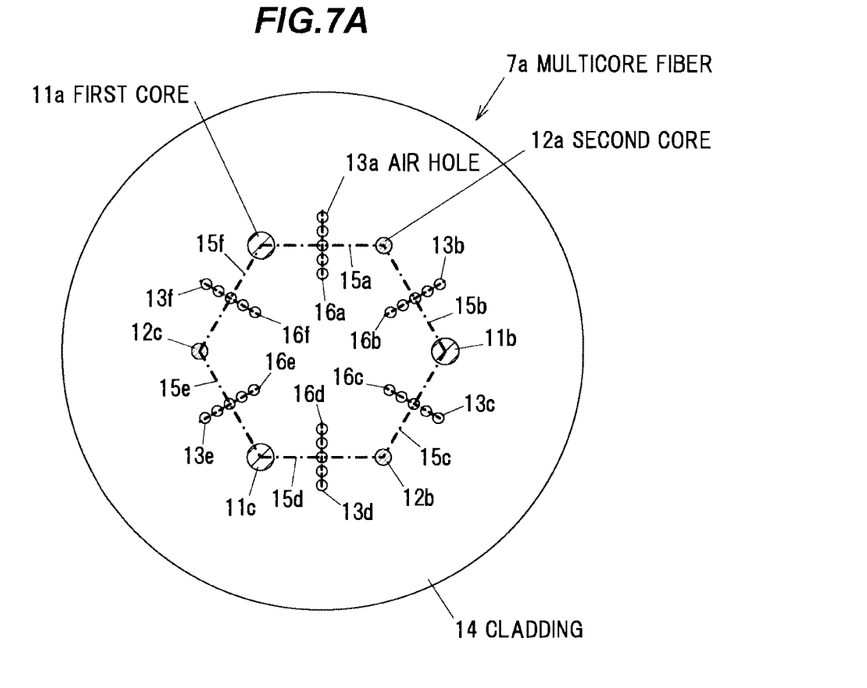
FIG. 7A is a cross sectional view of a multicore fiber in Example of the present invention.

As Example of the invention, a multicore fiber 7a having a configuration shown in FIG. 7A was manufactured.

A relative refractive index difference between the first core 11 and the cladding 14 is 0.36%, and a relative refractive index difference between the second core 12 and the cladding 14 is 1.0%. A diameter of the first core 11 is 9.0 μm and a diameter of the second core 12 is 6.2 μm. The numbers of the first cores 11 and the second cores 12 are three, respectively, and the first cores 11 and the second cores 12 are arranged alternately at vertexes of a regular hexagon. A distance between the first core 11 and the second core 12 (a length of each side of the regular hexagon) is 40 μm and a diameter of the cladding 14 is 190 μm. The sub medium region comprises the air holes 13 and diameter of the air hole 13 is 5.0 μm. A spacing between the adjacent air holes is 1.0 μm, and five air holes are located between the adjacent cores. The air holes of each air hole 13 are arranged along a perpendicular bisector of the first line segment 15 such that the air holes are arranged to be line symmetrical with respect to the first line segment 15.

Comparative Example

Figure 7B:
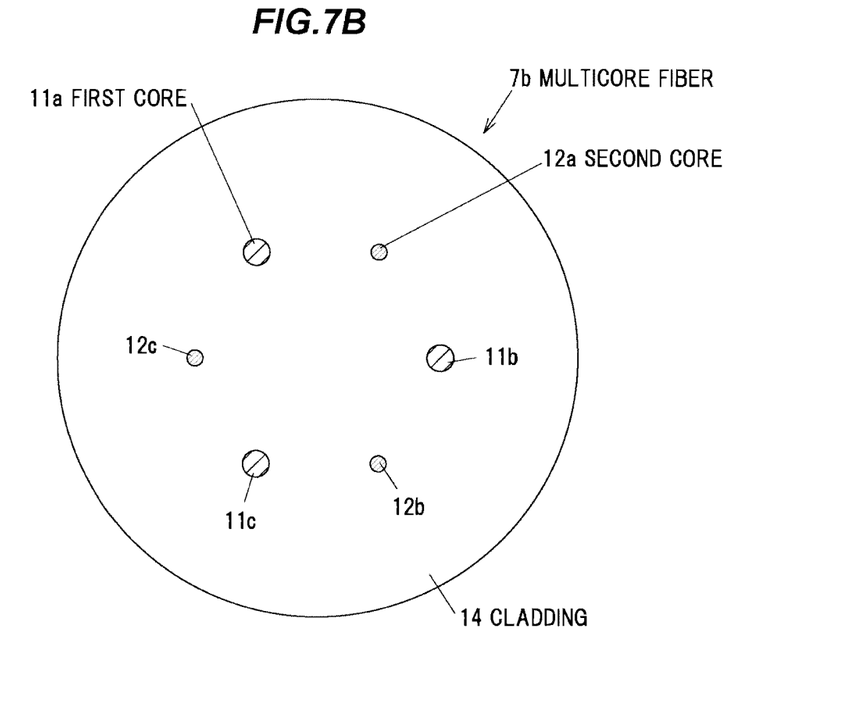
FIG. 7B is a cross sectional view of a multicore fiber in a comparative example.

A multicore fiber 7b shown in FIG. 7B was manufactured as a comparative example.

The multicore fiber 7b in the comparative example is manufactured under the same condition as the multicore fiber 7a shown in Example, except that the sub medium region (air hole 13) is not provided.

Figure 8:
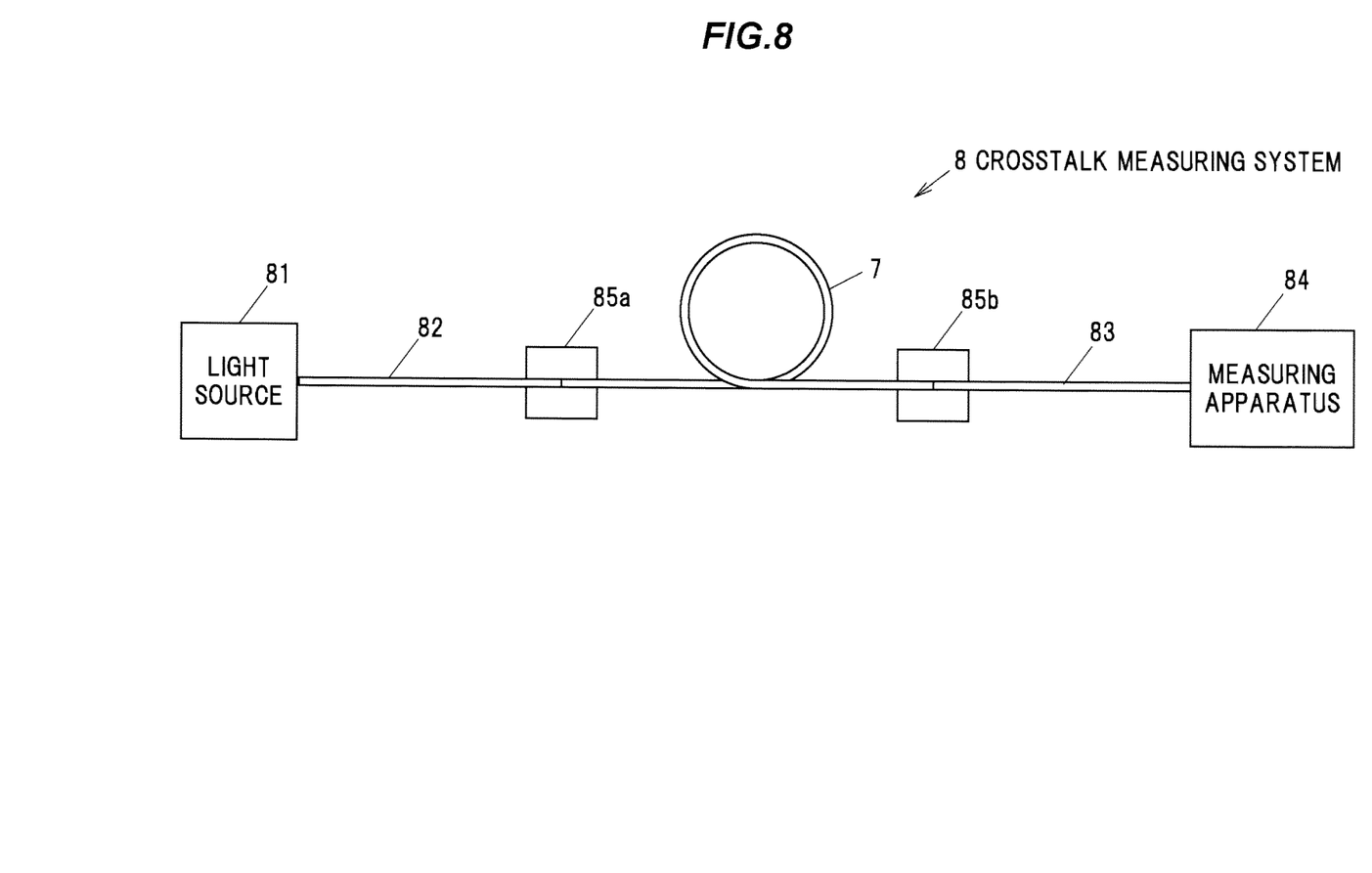
FIG. 8 is a schematic diagram showing a structure of a crosstalk measuring system for measuring the crosstalk in a multicore fiber.

The crosstalk of each core was measured by means of a crosstalk measuring system 8 as shown in FIG. 8.

In the crosstalk measuring system 8, an input single mode optical fiber 82 to which light from a light source 81 is input is connected to a cores (input core), at one end of the multicore fiber 7 (7a or 7b), and an output single mode optical fiber 83 is connected to each of two cores (output cores) that are adjacent to the core connected to the input single mode optical fiber 82, at another end of the multicore fiber 7. A light intensity of a light emitted from the output single mode optical fiber 83 is measured by a measuring apparatus 84. In addition, positioning (alignment) of a connecting portion between the input single mode optical fiber 82 and the input core and positioning of connecting portions of the output cores and the output single mode optical fiber 83 are carried out by core adjustment mechanisms 85a, 85b, respectively.

The crosstalk measuring system 8 is a system which measures an amount of the light which leaks out from the input core to the two output cores adjacent to the input core when the light is input to the multicore fiber 7 from the light source 81.

Table 1 shows the measuring result of the crosstalk of each core by means of the crosstalk measuring system. Here, the crosstalk value in Table 1 is a value measured (converted value) by using a multicore fiber with a length of 100 km.

TABLE 1

| Input Core No. | Output Core No. | Example (dB) | Comparative example (dB) |
| --- | --- | --- | --- |
| 11 a | 12 a | −49.9 | −20.0 |
|  | 12 c | −53.9 | −19.0 |
| 12 a | 11 a | −52.4 | −19.5 |
|  | 11 b | −48.4 | −20.3 |
| 11 b | 12 a | −49.4 | −20.0 |
|  | 12 b | −45.9 | −20.5 |
| 12 b | 11 b | −43.4 | −20.5 |
|  | 11 c | −43.9 | −21.5 |
| 11 c | 12 b | −44.4 | −21.5 |
|  | 12 c | −47.4 | −20.5 |
| 12 c | 11 c | −46.4 | −19.5 |
|  | 11 a | −48.9 | −20.5 |

It is confirmed that the crosstalk of the multicore fiber 8a in Example is from −43.4 to −53.9 dB (average value is −47.9 dB), while the crosstalk of the multicore fiber 8b in the comparative example is from −19.0 to −21.5 dB (average value is −20.3 dB). It is thus confirmed that the crosstalk is reduced in Example of the present invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:
1. A multicore fiber comprising:
cores located at vertexes of a polygonal ring; and
a cladding including sub medium regions and covering the cores, a refractive index of the cladding being lower than a refractive index of the cores and higher than a refractive index of the sub medium regions;
wherein the sub medium regions are arranged at positions to reduce a crosstalk between adjacent cores of the cores,
wherein a shape of each of the sub medium regions is an ellipse that crosses a first line segment linking the adjacent cores, and wherein a longitudinal direction of the ellipse crosses a direction of the first line segment.

2. The multicore fiber according to claim 1, wherein no core is included inside the polygonal ring.

3. The multicore fiber according to claim 1, wherein the cores comprise first cores having a first optical characteristic and second cores having a second optical characteristic which is different from the first optical characteristic, wherein the first cores and the second cores are located on the vertexes of the polygonal ring alternately.

* * * * *